H. W. PETERSON.
AMUSEMENT DEVICE.
APPLICATION FILED SEPT. 29, 1919.
1,372,542.
Patented Mar. 22, 1921.
8 SHEETS—SHEET 1.
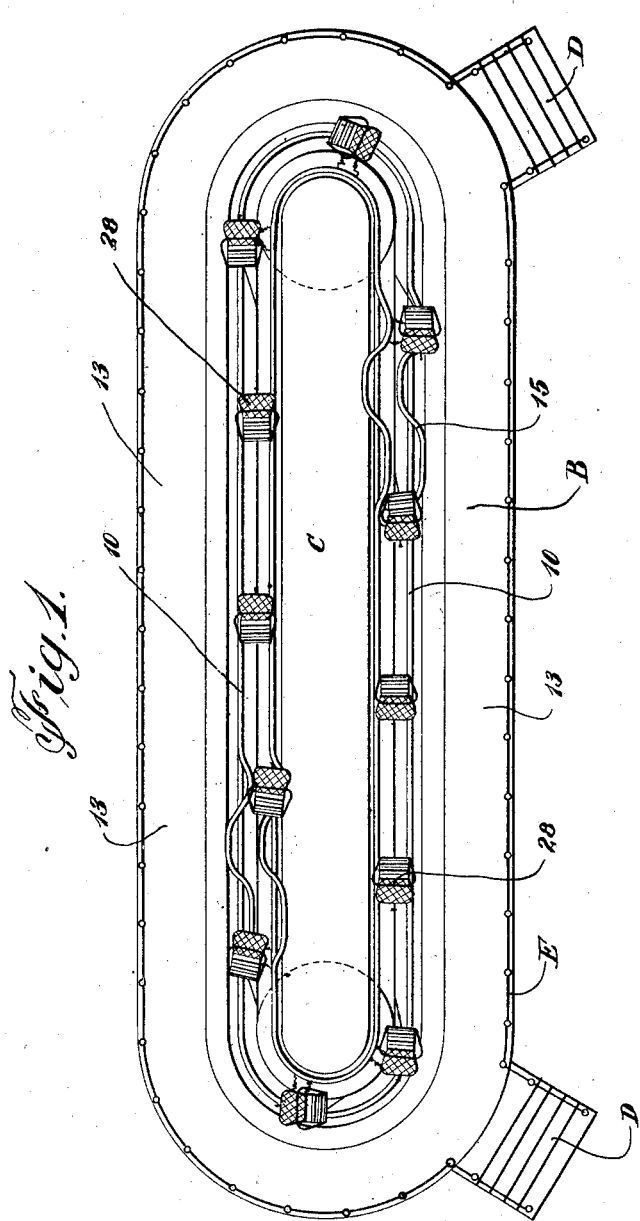
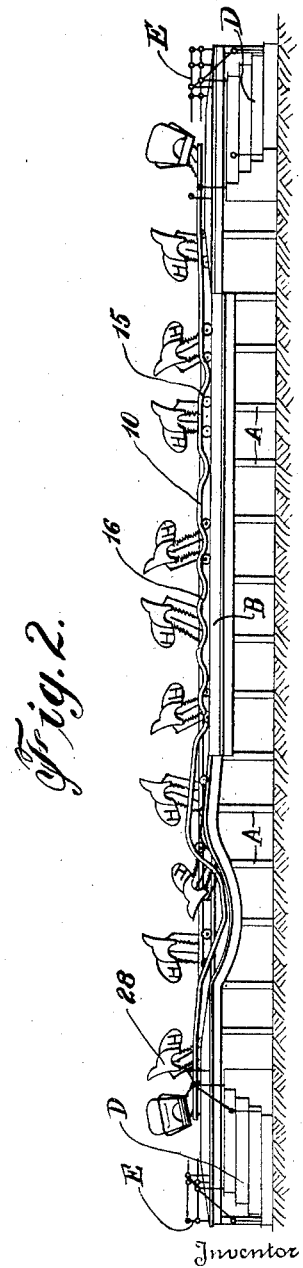
Witnesses
Benj. Kahn
Inventor
Harry W. Peterson
By Victor J. Evans.
Attorney

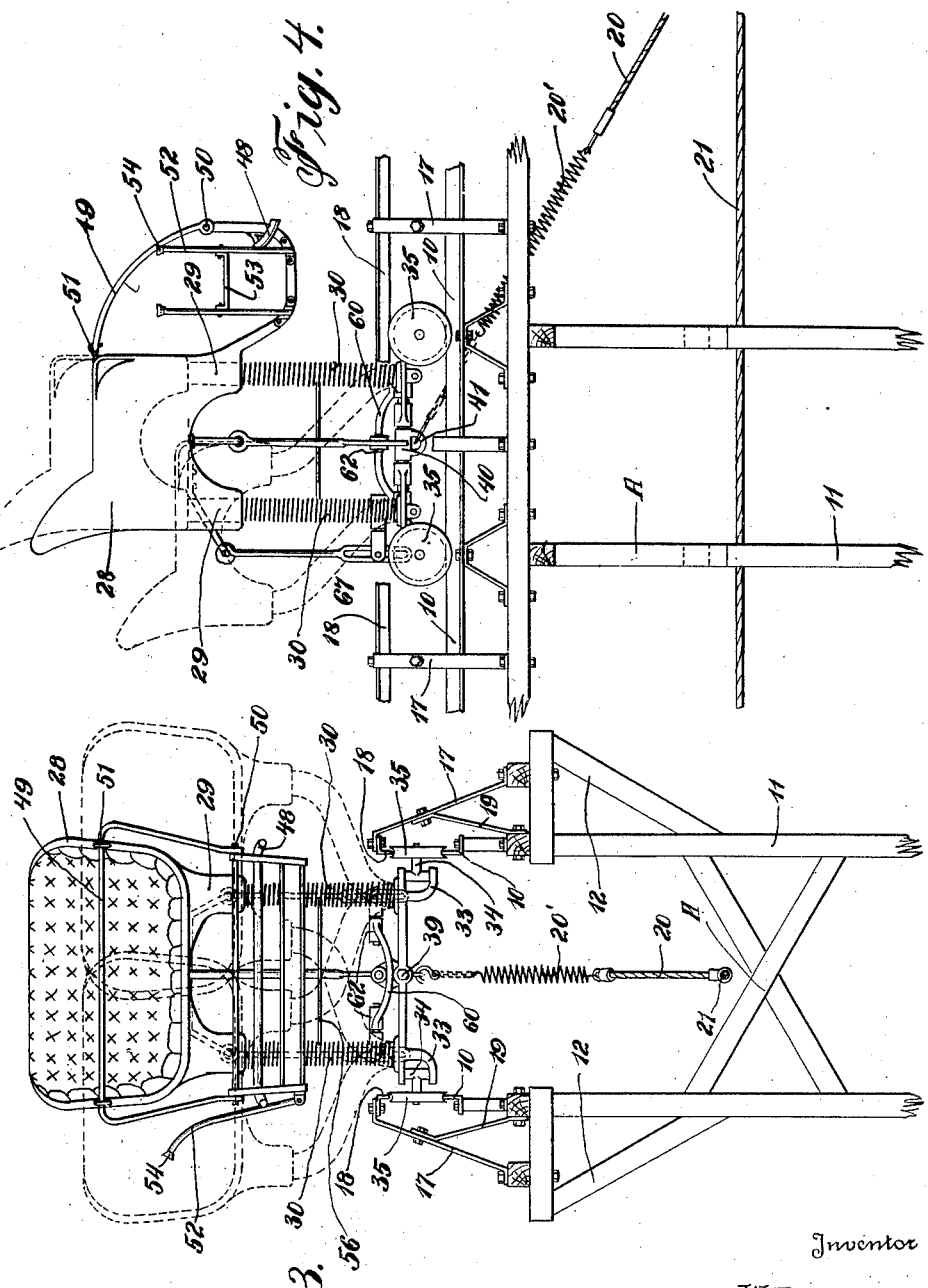

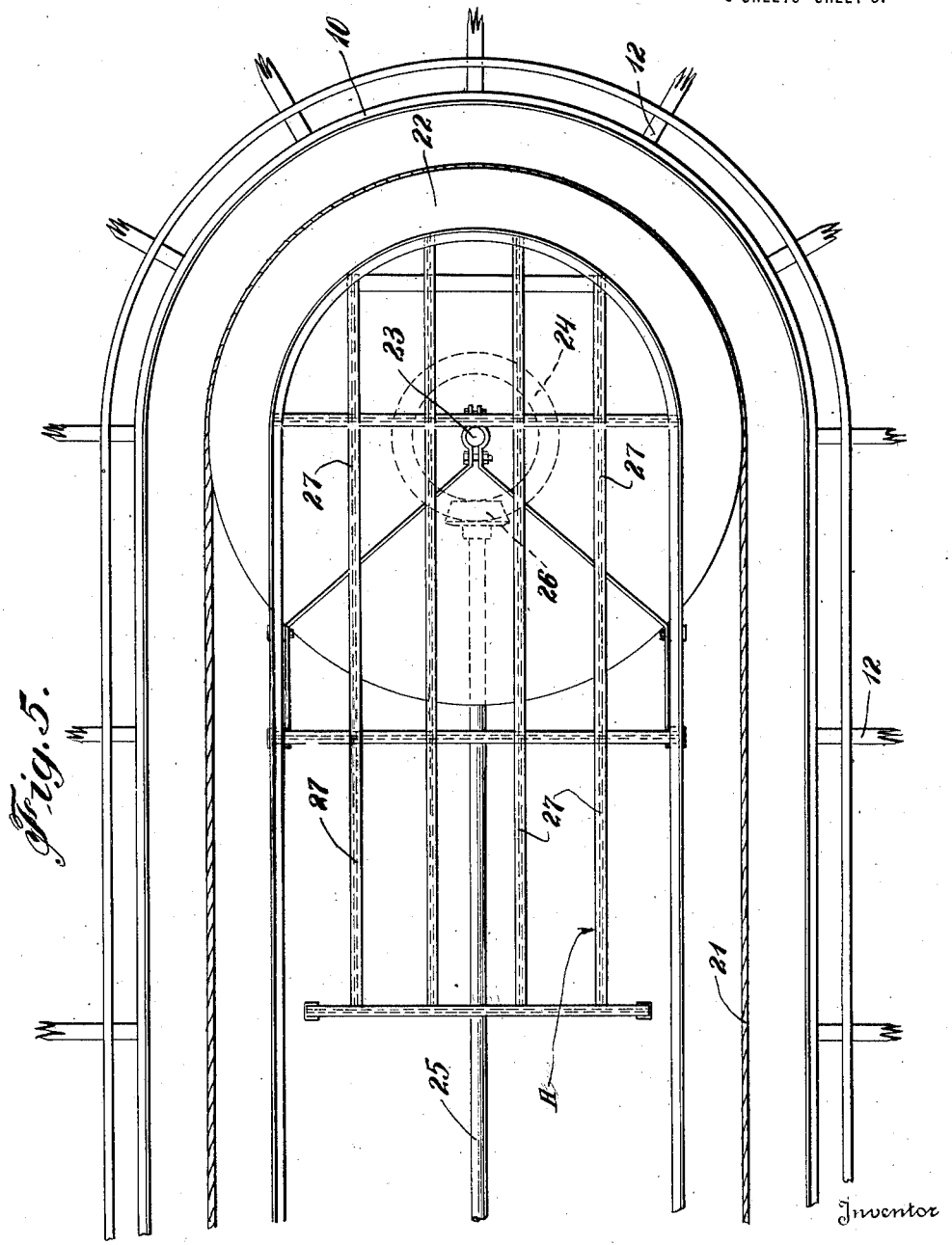

H. W. PETERSON.
AMUSEMENT DEVICE.
APPLICATION FILED SEPT. 29, 1919.
1,372,542.
Patented Mar. 22, 1921.
8 SHEETS—SHEET 4.
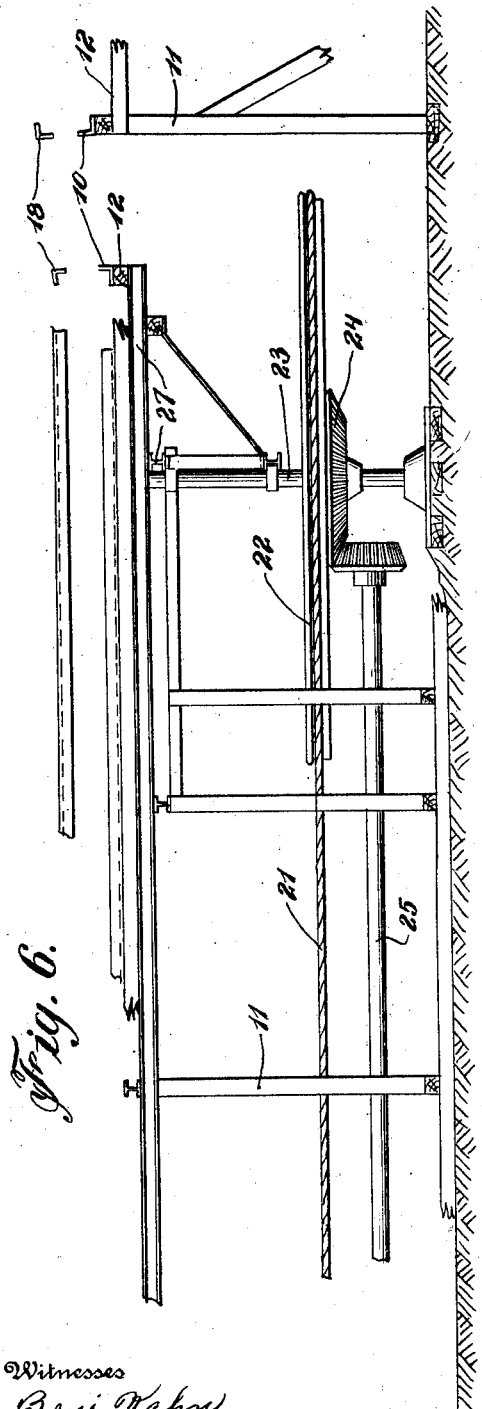
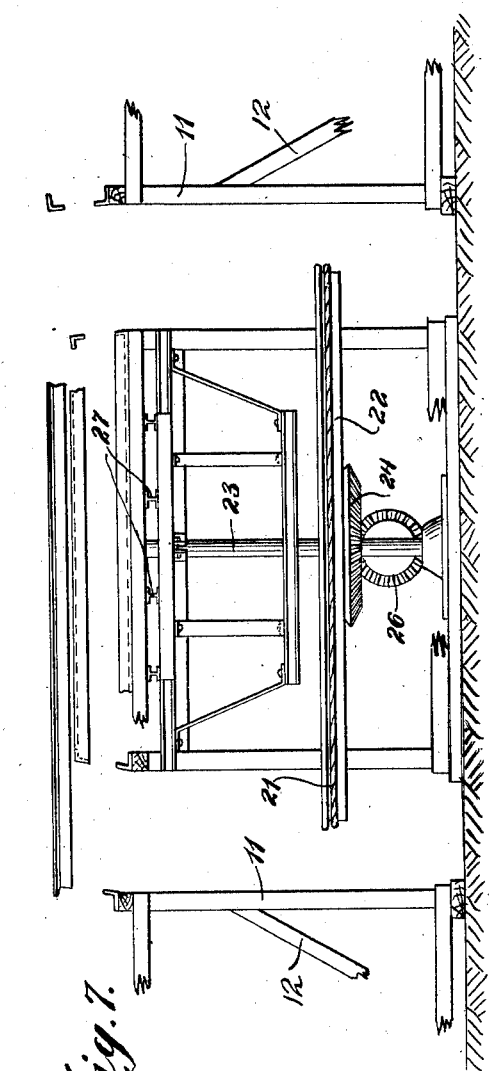
Inventor
Harry W. Peterson.

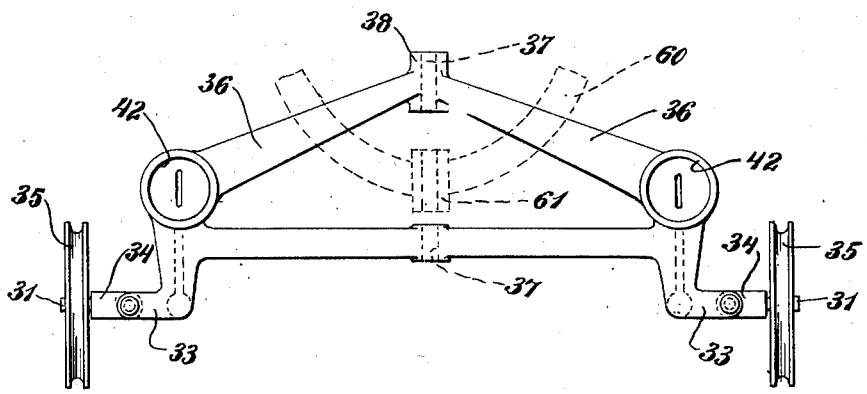
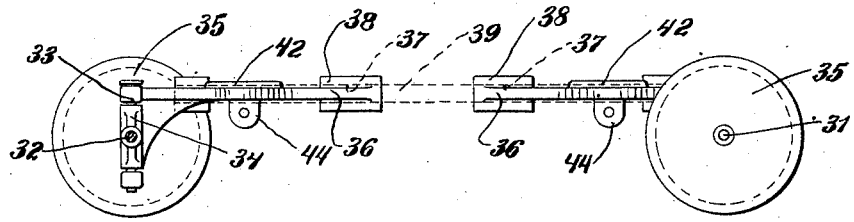
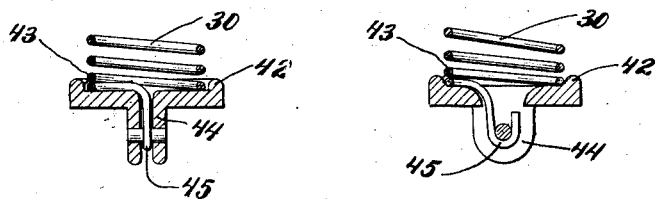

H. W. PETERSON.
AMUSEMENT DEVICE.
APPLICATION FILED SEPT. 29, 1919.

1,372,542.

Patented Mar. 22, 1921.
8 SHEETS—SHEET 6.

Witnesses
Benj. Kahn

Inventor
Harry W. Peterson
By Victor J. Evans
Attorney

H. W. PETERSON.
AMUSEMENT DEVICE.
APPLICATION FILED SEPT. 29, 1919.
1,372,542.
Patented Mar. 22, 1921.
8 SHEETS—SHEET 7.
Fig. 15.
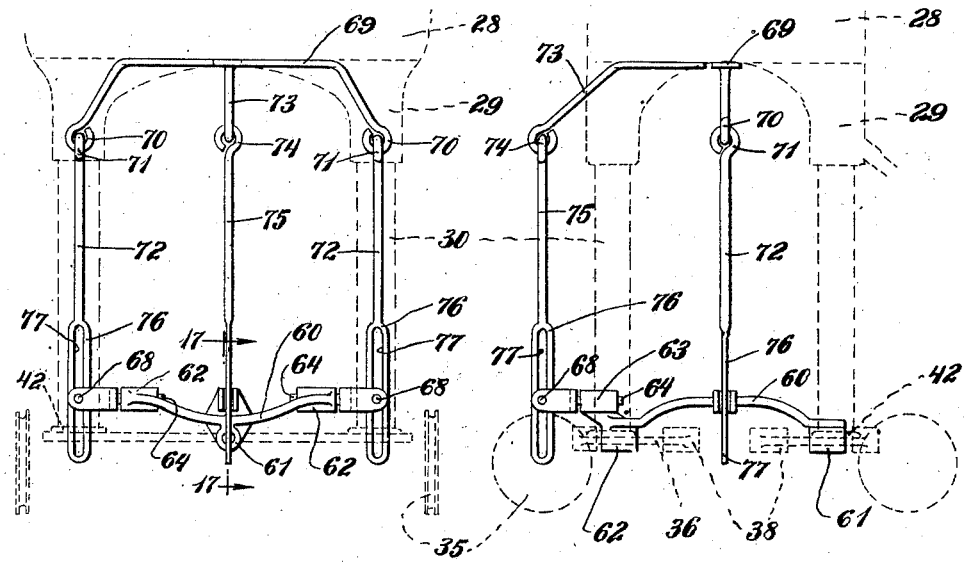
Fig. 16.
Fig. 17.
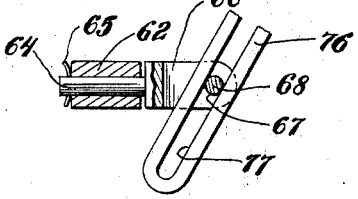
Fig. 18.
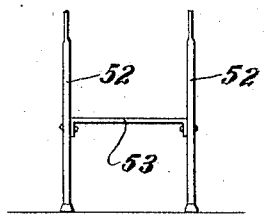
Fig. 19.
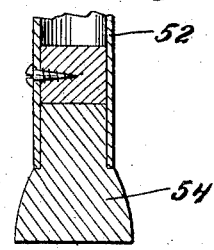
Witnesses
Benj. Kahn
Inventor
Harry W. Peterson
By Victor J. Evans
Attorney

H. W. PETERSON.
AMUSEMENT DEVICE.
APPLICATION FILED SEPT. 29, 1919.

1,372,542.

Patented Mar. 22, 1921.
8 SHEETS—SHEET 8.

Inventor.
Harry W. Peterson

Witnesses
Benj. Kahn

By Victor J. Evans
Attorney

UNITED STATES PATENT OFFICE.

HARRY W. PETERSON, OF SPRINGFIELD, ILLINOIS.

AMUSEMENT DEVICE.

1,372,542.     Specification of Letters Patent.     Patented Mar. 22, 1921.

Application filed September 29, 1919. Serial No. 327,165.

*To all whom it may concern:*

Be it known that I, HARRY W. PETERSON, a citizen of the United States, residing at Springfield, in the county of Sangamon and State of Illinois, have invented new and useful Improvements in Amusement Devices, of which the following is a specification.

This invention relates to amusement devices, adapted to be erected in amusement parks or the like, and has particular application to that class of devices wherein a car body or seat travels over a continuous path having curvatures and irregularities which effect different motions and movements of the car body.

One of the chief characteristics of the invention is mounting the seat or car body upon springs, which afford the seat or car body perfect freedom of action which together with the curvature and irregularities of the track set up a rolling motion of the car body during its travel over the tracks.

In carrying out my invention, I provide means for controlling the motion of the seat or car body consistent with the speed of the car, this means being in the form of a safety device to check any undue or too violent motion of the car when traveling at high speed, until the speed of the car is reduced.

In practice, I also make use of guide rails, disposed with relation to the rails of the track for holding the car upon the track and forcing it to follow the curvatures and irregularities of the latter.

With these and other objects which will appear when the following detail description is taken in connection with the accompanying drawings, the invention resides in the construction, combination and arrangement of parts as claimed.

In the drawings forming part of this specification, like numerals of reference indicate similar parts in the several views and wherein:

Figure 1 is a plan view.

Fig. 2 is a side elevation.

Fig. 3 is a transverse sectional view of the trackway showing the car body in front elevation and several of its positions by dotted lines.

Fig. 4 is an enlarged detail view taken at right angles to Fig. 3 also showing by dotted lines certain positions which the car body is capable of occupying.

Fig. 5 is an enlarged fragmentary plan view of one end of the track.

Fig. 6 is a view in side elevation of the parts shown in Fig. 5.

Fig. 7 is an end elevation.

Fig. 8 is a plan view of a portion of the supporting structure or frame of the car body.

Fig. 9 is a side elevation thereof.

Fig. 10 is a sectional view through the sockets for the reception of the spring.

Fig. 11 is a view taken at right angles to Fig. 10.

Fig. 15 is a rear elevation showing the safety device positioned with relation to the car body or seat.

Fig. 16 is a side elevation thereof.

Fig. 17 is a sectional view taken on the line 17—17 of Fig. 15.

Fig. 18 is a detail view of the pivoted step for the seat.

Fig. 19 is a sectional view taken through one leg thereof.

Figure 13:
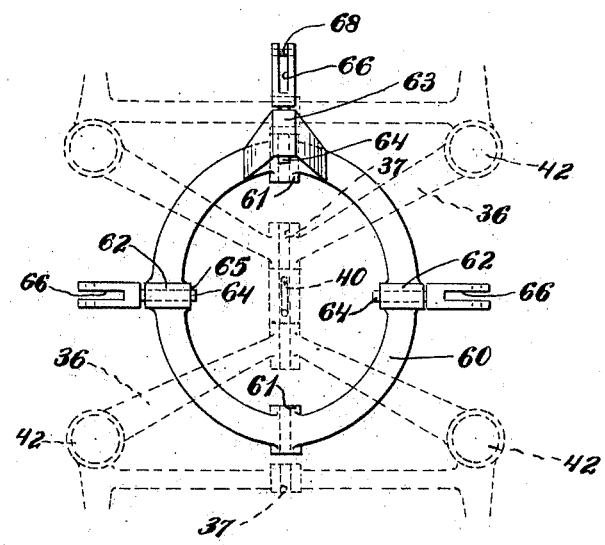
Fig. 13 is a plan view of the frame or supporting structure of the safety device.
Figure 14:
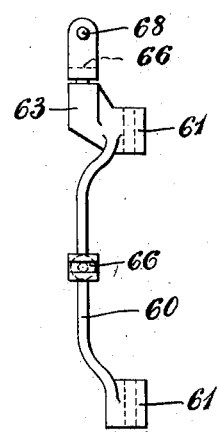
Fig. 14 is a side elevation thereof.
Figure 20:
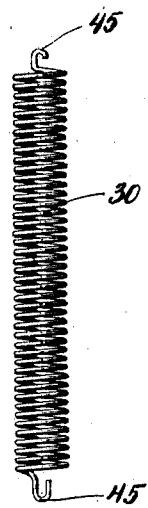
Fig. 20 is a detail view of one of the springs.

Referring to the drawings in detail, 10 indicates the continuous track, the rails of which are supported above the ground or surface by the supporting structure indicated generally at A, and including the spaced uprights 11, connected by diagonally disposed bracing elements 12 which may be wood, angle iron or any other suitable material. The supporting structure A also supports the floor board 13 of a platform which is divided by means of the tracks into an outer section B and an inner or central section C. Steps D lead from the ground to the platform as shown. A railing E surrounds the platform. As clearly illustrated in several views of the drawings, the rails 10 of the track at certain points are provided with compound curves as at 15, while in other instances the rails of the track rise and fall as at 16. The purpose of these irregularities in the tracks is to afford the car body or seat which travels over the tracks changes in motion as illustrated in Fig. 1. Rising from the platform at opposite sides of the track are the arms 17 of a supporting structure for the guide rails 18. These arms are braced by means of the elements 19. The guide rails 18 are disposed immediately above the rails 10 of the track, and serve to hold the seat or car body upon the track. The guide rails 18 follow the course of the track and consequently force the car body or seat to follow the curvatures and irregularities of the track.

The car bodies or seats are connected to the branches 20 of an endless cable 21 which is trained over the grooved wheels 22 at opposite ends of the track, and which wheels are rotated by a suitable source of motive power. The cable 21 is thus actuated to move the car bodies or seats over the track, this cable operating between the rails 10 of the track and a few feet below the latter. As shown in Figs. 6 and 7, the grooved wheels 22 are fixed upon the vertical shafts 23 which are journaled in suitable bearings for rotation, each shaft 23 having fixed thereto a bevel gear 24 arranged beneath the wheel 22. The driving shaft 25 is rotated by means of a motor (not shown) and is equipped with small bevel gears 26 the latter meshing with the beveled gears 25, thus rotating the shaft 23 and the wheels 22. The shaft 23 carrying the wheels 22, and also the innermost rail of the track are suitably braced by the eye beams 27 affording the track and the structure generally at the end maximum strength and rigidity. An expansion spring 20' provides a connection between the branches 20 of the cable and the car body as clearly shown in Figs. 3 and 4.

The car body 28 may be of any suitable construction having legs 29 connected with the wheeled frame of the car through the instrumentality of compression springs 30. The wheel supporting frame of the car is clearly illustrated in Fig. 8 and includes front and rear axles 31 and 32 respectively. The front axle is forked as at 33 to accommodate the steering knuckles 34 for the wheels 35. These parts are constructed and associated in any well known manner. The frame also includes a pair of divergently disposed members 36 projecting toward the center of the frame from both the front and rear axles. The front and rear axles are provided with alined openings 37, and each pair of members 36 at their point of juncture is formed to provide a collar 38, the collars 38 also being disposed in alinement with each other and with the openings 37 of the axles. A connecting bolt or rod 39 is passed through said openings and collars, and supported upon the connecting bolt or rod 39 between the collar 38 is a sleeve 40 from which depends an eye 41. The branches 20 of the main cable 21 are connected with the eyes 41 of the respective bars. The members 36 at their point of juncture with the axles of the car defines sockets 42 for the reception of the lower ends of the springs 30. The legs 29 of the car body are also provided with sockets of the same construction for the reception of the upper ends of the springs 30. These sockets are clearly illustrated in Figs. 10 and 11, and embody a cup shaped portion 43 which receive one or more of the lowermost convolutions of the spring, and a bifurcated portion 44, between the separated portions of which one end of the spring is extended. This end of the spring indicated at 45 is looped about a pin 46 passed through alined openings in the separated portions 44. In this manner the springs are securely fastened to both the car body and the running gear therefor. The car body is provided with a foot rest 48 and a hand rail 49, the latter being pivoted as at 50 to the forward end of the car body and adapted to be engaged by resilient clamps 51 carried by the arm rest of the seat of the car for holding the hand rail in active or operative position. The car body is also equipped with a step including spaced parallel members 52 connected by means of the step proper 53. The side members 52 are pivotally connected to one side of the body of the car so as to assume the position indicated in Fig. 3 while the car is in motion, the step being lowered to rest against the platform when its use is desired. The side members 52 are hollow and adapted to receive a rubber foot 54.

Figure 12:
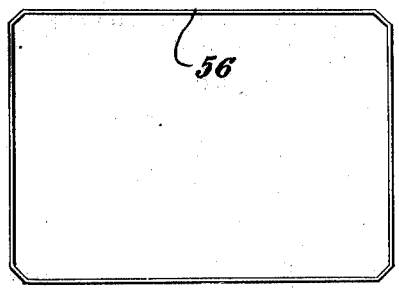
Fig. 12 is a plan view of the reinforcing frame for said springs.
Figure 21:
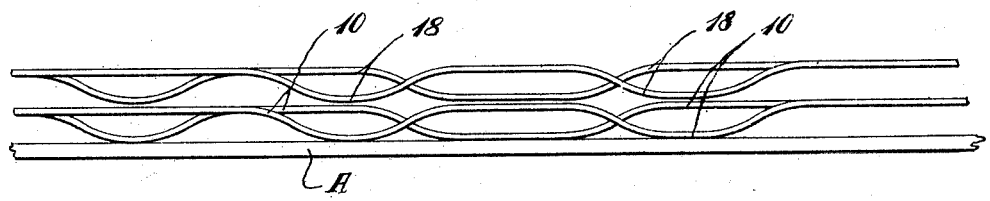
Fig. 21 is a fragmentary view of a modified track construction.
Figure 22:
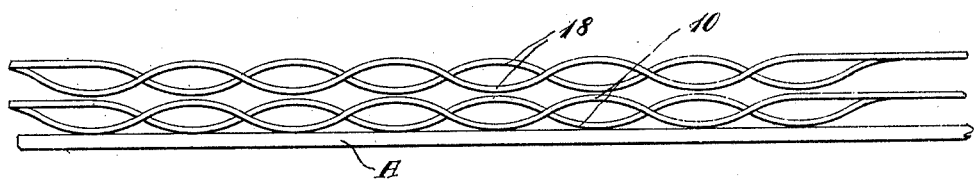
Fig. 22 is a similar view of another modified form.
Figure 23:
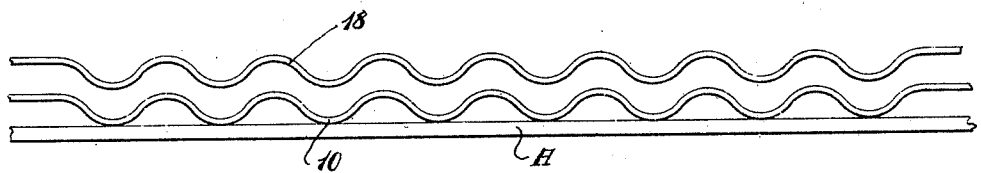
Fig. 23 is a further modified form.
Figure 24:
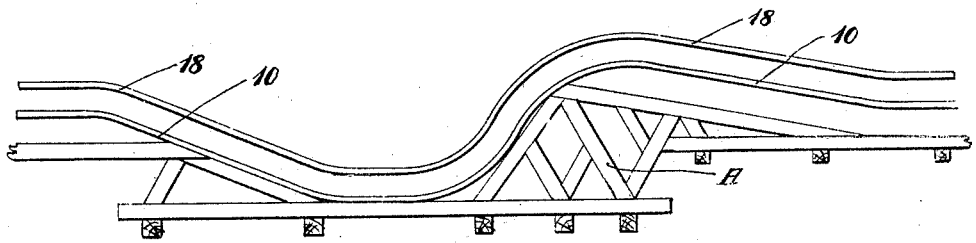
Fig. 24 is a similar view of a still further modified form.

In practice, the cars are moved over the rails 10 in a manner above stated, the guide rails 18 maintaining the car upon the tracks and closing the bar to follow the curvatures and irregularities of the latter. Consequently the cars in some instances move inwardly and outwardly in quick successive order when passing over the compound curve 15, while in other instances the car is given rocking motion when passing over the raised and depressed portions 16 of the track. Since the car body is supported by the compression springs 30, it is obvious that the cars are allowed perfect freedom in action and this coupled with the fact that the cars pass over the curvatures and irregularities of the track a rolling motion is set up in the car body affording considerable pleasure and amusement to those occupying the car. The car body is allowed to move in either direction laterally and is also supported yieldably for vertical movement. Springs 30 are also terminally secured to the car body and the running gear, in a manner to prevent casual separation, and this fact coupled with the fact that the guide rails 18 hold the car positioned upon the track assures safety in the use of the device. The four springs 30 connecting the seat and running gear, are connected together by means of a wire steel frame 56 illustrated in Fig. 12 which frame prevents the springs from bulging. It is to be understood that the freedom of action of the car body under the influence of the springs 30 is limited to a predetermined speed of the car, and when the cars travel in excess of this predetermined speed, undue or violent motion of the car is checked by means of a safety device to be presently described.

This safety device comprises an annulus disposed above the running gear of the car formed at diametrically opposite points with the collars 61 disposed in alinement with the collars 38 of the running gear and also in alinement with the openings 37 of the axle for the reception of the connecting bolt or rod 39. In this manner, the annulus 60 is held associated with the running gear of the car. At points diametrically opposite the transverse center of the annulus 60, the latter is provided with the collars 62, while an additional collar 63 is provided at a point immediately above the collar 62 adjacent the rear axle. In each of the collars 62 and 63 respectively is arranged a bolt 64 having one end projecting with the annulus and provided with an opening for the reception of a cotter pin 65 by means of which the bolt is held positioned within the collars. The outer end of the respective bolts is enlarged and bifurcated as at 66, the separated portions defined by the bifurcation having alined openings 67 for the reception of the pin or stud 68. Secured to the underside of the seat of the car, the yoke 69 terminates to provide eyes 70 which are connected with the eyes 71, of a pair of vertically disposed rods 72. As shown in Figs. 15 and 16, the yoke 69 projects from the rear of the car body while the rods 72 are arranged at the rear and in parallelism with the adjacent springs 30. Depending from the underside of the seat of the car centrally thereof is an eye bolt 73, the eye of which receives the eye 74 of an additional vertically disposed rod 75 which is similar to the rods 73. Both the rods 72 and 75 respectively are flattened for a portion of their length throughout one end thereof as at 76, and these flattened terminals are provided with slots 77 which receive the pins or studs 68 connecting the separated portions of the bolts 64. It is manifest that the car body is allowed perfect freedom to swing or roll in any direction while the car is traveling at certain speed, but when the speed of the car is increased resulting in undue and violent motions of the body, the rods 72 and 75, respectively, swing to a position in the limit of their movements, whereby they engage the pins or studs 68 thus checking the motion of the car body under such conditions. As the speed of the car is reduced, the car body will continue its change in motion as it passes over the curvatures in the track to the amusement and pleasure of the occupants of the car.

While I have shown and described what I consider the preferred embodiment of the invention, I desire to have it understood that I do not limit myself in this connection inasmuch as such changes may be resorted to when desired as fall within the scope of what is claimed.

Having thus described my invention what I claim as new is:—

1. An amusement device comprising a continuous track having compound curves, a carrier movable over said track, springs supporting the body of the carrier, and providing for a change of motion thereof during the movement of the same over the track, and a frame connecting said springs to prevent bulging of the latter.

2. An amusement device comprising a continuous track, having a compound curve, a carrier movable over said track, means for supporting the body of the carrier for variation of movements, means for limiting the movements of said body in its different directions and said means including a plurality of pivoted members attached to said body, and a slot and pin connection between each member and the running gear of the carrier.

3. An amusement device comprising a track having compound curves, a wheeled carrier movable over said track, guide rails engaging said wheels for holding the latter upon the track, yieldable means supporting the body of the carrier for lateral rocking movement and movement in a vertical plane, means for checking undue and violent movements of the body when traveling over the track at high speed, and means for preventing the yieldable means from bulging as described.

4. An amusement device comprising a track having compound curves, a wheeled carrier movable over said track, guide rails engaging said wheels, means supporting the body of the carrier for freedom of action when moving over said track, a member secured to the body of the carrier, rods pivoted on said member and arranged in parallelism, and slot and pin connections between each of said rods and the running gear of the carrier to limit the movements of the body.

5. An amusement device comprising a continuous track having compound curves, a wheeled car movable over said track, guide rails engaging said rails, means for supporting the body of the carrier and setting up a variation of motion thereof during the course of travel of said carrier, an annulus secured to the running gear of said carrier, a plurality of rods depending from the carrier, and means carried by the annulus and engaging said rods to limit the movements of the carrier.

6. An amusement device comprising a continuous track and a compound curve, a carrier movable over said track, means for supporting said carrier, and a variation of movements, an annulus secured to the running gear of the carrier, bifurcated members carried by the annulus, pivoted rods depending from said carrier and slidable through the bifurcated members, and slot and pin connections between the rods and said bifurcated member for limiting the movements of the carrier as described.

In testimony whereof I affix my signature.

HARRY W. PETERSON.